US00RE37921E

(19) United States
(12) Reissued Patent
Martin et al.

(10) Patent Number: US RE37,921 E
(45) Date of Reissued Patent: Dec. 10, 2002

(54) PRESSURIZED WATER CLOSET FLUSHING SYSTEM

(75) Inventors: Raymond Bruce Martin, Bloomfield Hills, MI (US); Thomas P. Beh, Ypsilanti, MI (US); Mark M. Mrocca, Belleville, MI (US)

(73) Assignee: W/C Technology Corporation, Farmington Hills, MI (US)

(21) Appl. No.: 09/696,091

(22) Filed: Oct. 24, 2000

Related U.S. Patent Documents

Reissue of:
(64) Patent No.: 5,970,527
Issued: Oct. 26, 1999
Appl. No.: 09/034,472
Filed: Mar. 4, 1998

U.S. Applications:
(60) Provisional application No. 60/039,961, filed on Mar. 7, 1997.

(51) Int. Cl.[7] ..... E03D 3/10
(52) U.S. Cl. ..... 4/361; 4/354
(58) Field of Search ..... 4/354, 359, 360, 4/361, 362

(56) References Cited

U.S. PATENT DOCUMENTS

| | | | | |
|---|---|---|---|---|
| 1,104,292 | A | 7/1914 | Cowperthwaite | 4/363 |
| 1,316,715 | A | 9/1919 | Haas | 4/363 |
| 1,654,602 | A | 1/1928 | Reynolds | 137/596 |
| 1,987,229 | A | 1/1935 | Curtin | 4/363 |
| 2,182,980 | A | 12/1939 | Bruzenak | 4/362 X |
| 2,616,450 | A | 11/1952 | Legge et al. | 137/670 |
| 2,715,228 | A | 8/1955 | McLanahan | 4/363 X |
| 3,011,176 | A | 12/1961 | Langdon | 4/356 |
| 3,563,384 | A | 2/1971 | DeLaney et al. | 210/173 |
| 3,566,416 | A | 3/1971 | Altieri et al. | 4/363 |
| 3,677,294 | A | 7/1972 | Gibbs et al. | 137/572 |
| 3,817,279 | A | 6/1974 | Larson | 137/572 |
| 3,820,171 | A | 6/1974 | Larson | 4/360 |
| 4,209,863 | A | 7/1980 | Lindauer | 4/228.1 X |
| 4,233,698 | A | 11/1980 | Martin | 4/354 |
| 4,261,545 | A | 4/1981 | Allen | 251/40 |
| 4,656,676 | A | 4/1987 | Dufau et al. | 4/225.1 |
| 4,662,395 | A | 5/1987 | Strangfeld | 137/614.19 |
| 5,046,201 | A | 9/1991 | Steinhardt et al. | 4/354 |
| 5,241,711 | A | 9/1993 | Badders | 4/359 |
| 5,361,426 | A | 11/1994 | Martin | 4/361 |
| 5,406,652 | A | 4/1995 | Hennessy | 4/354 |
| 5,435,019 | A | 7/1995 | Badders | 4/359 |

FOREIGN PATENT DOCUMENTS

| | | |
|---|---|---|
| GB | 788 | of 1887 |
| DE | 237 592 | 12/1909 |
| GB | 342879 | 2/1931 |
| GB | 447056 | 5/1936 |
| GB | 635737 | 4/1950 |
| GB | 1093277 | 11/1967 |

OTHER PUBLICATIONS

International Publication No. WO 91/16508, dated Oct. 31, 1991, Applicant Kohler Co., 26 pages.

*Primary Examiner*—Robert M. Fetsuga
(74) *Attorney, Agent, or Firm*—Dinnin & Dunn, P.C.

(57) ABSTRACT

A pressurized water closet operating system comprises a water vessel, an external manifold mounted directly on said vessel, and an internally mounted flush valve assembly. The manifold comprises a water pressure regulator, an air induction system, and a manually operable flush valve actuator. The manually operable flush valve actuator controls the discharge of water under pressure from the water vessel into the toilet bowl.

15 Claims, 8 Drawing Sheets

PRESSURIZED WATER CLOSET FLUSHING SYSTEM

Matter enclosed in heavy brackets [ ] appears in the original patent but forms no part of this reissue specification; matter printed in italics indicates the additions made by reissue.

This application claims priority from Provisional Application number 60/039,961 filed [Jul. 30] *Mar. 7* 1997.

BACKGROUND OF THE INVENTION

1. Field of the Invention

The present invention relates to an improved pressurized water closet that minimizes water usage incident to flushing yet maximizes waste extraction propulsion energy and reliability of the system.

2. Related Art

The herein disclosed pressurized water closet is an improvement over the systems disclosed in U.S. Pat. No. 4,233,698 issued Nov. 18, 1980 and U.S. Pat. No. 5,361,426 issued Nov. 8, 1994, as well as over the system disclosed in application Ser. No. 08/457,162 filed Jun. 1, 1995.

The basic components of a pressurized water closet are a water vessel, a flush valve and a flush valve actuator. The aforesaid components are generally installed internally of a conventional water closet. The pressurized water closet is energized by water pressure from a conventional fresh water supply system.

In operation, as the water level rises in the water vessel after flush, air internally of the water vessel is compressed. When water pressure in the vessel equals the supply line pressure or when it causes the pressure regulator valve to shut, in the event of supply line pressure greater than that allowed by the regulator, flow of water into the water vessel ceases and the system is conditioned for operation. When the flush valve actuator is actuated, the flush valve opens whereafter the compressed air in the water vessel pushes the water stored therein into the water closet bowl at relatively high discharge pressure and velocity, flushing waste therefrom with minimum water consumption.

Known pressurized water closet flushing systems have proved to be successful in the marketplace but generally exhibit one or more operating characteristics that can be improved upon. Specifically, propulsion energy that effects waste extraction from the toilet bowl is relatively inefficient; high or low pressure in the fresh water system may result in inconsistent operation; the volume of water discharged is inconsistent; there is no provision for internal release of water system pressure above design pressure; flush action is not independent of duration of flush valve actuator depression; closure of the flush valve upon the occurrence of low supply line pressure is not positive; the actuator valve is not self cleaning; there is no provision for varying toilet bowl refill volume, and there is no provision for the addition of disinfectant to the toilet bowl without compromise of flushing system integrity.

SUMMARY OF THE INVENTION

The pressurized water closet flushing system of the present invention solves the aforesaid problems. Specifically, the system exhibits a substantial improvement in waste extraction energy and in the consistency and reliability of the flushing action. The system uses a minimum volume of water upon discharge; provides internal pressure relief upon the occurrence of water system pressure above design pressure; has a flush action that is not a function of time of actuator depression; exhibits positive closure upon the occurrence of low supply line pressure; has a self cleaning actuator valve; and toilet bowl refill volume can be customized to meet application specifications. Moreover, the system exhibits minimal differences in water consumption at high and low water pressures; utilizes two internal back checks, a built in drain, an internal discharge port, and provides for the addition of disinfectant to the toilet bowl without compromise of flushing system integrity.

Yet another feature of the invention is that a water flow path is opened through the actuator directly above the flush valve cylinder to a disinfectant reservoir thence to the toilet bowl when the toilet's manual flush valve actuator is depressed thereby injecting disinfectant into the toilet bowl.

The aforesaid features of the pressurized flush system of the present invention result in stronger and more effective extraction and drain line carry, cleaner bowls, fewer drain line clogs, no hidden leakage of water between flushes, and smaller sized pipe systems. The system of invention produces a flushing action which clears and cleans a toilet bowl while consuming less than one and six tenths gallons of water while meeting the highest municipal codes. The toilet bowl is emptied by one flush without drain line "drop-off" common to many low water volume, or gravity-flow type toilets.

In operation, actuation of the manual operator creates a pressure differential across a flush valve piston disposed in a flush valve cylinder. The flush valve piston and a flush valve thereas move upwardly at a controlled rate.

Upward or opening movement of the flush valve permits water to be ejected into the toilet bowl from the water vessel under relatively high pressure effecting extraction of the contents of the toilet bowl. Flush commences simultaneously with manual depression of the flush valve actuator and is time controlled so as to produce a prolonged high energy surge of water which carries bowl waste into the sewer.

Closure of the flush valve is timed by the distribution ratio of incoming water to the upper chamber of the flush valve cylinder and the water vessel. When the manual flush valve actuator is released, the fluid flow path from the upper chamber of the flush valve cylinder to ambient is closed. At this point, a predetermined portion of the water supplied under pressure from the water supply system flows directly to the upper chamber of the flush valve cylinder. The remaining portion of water supplied by the system flows to the main chamber of the water vessel. Prior to closure of the flush valve, water and a predetermined amount of disinfectant flowing to the water vessel passes therethrough into the toilet bowl thereby to disinfect the bowl and restore the water seal in the bowl's trap so as to prevent sewer gasses from exiting through the toilet bowl. When the upper chamber of the flush valve cylinder is filled, and the flush valve is closed, all incoming water is directed into the water vessel.

Water rising in the water vessel under regulated water system pressure compresses the air entrapped therein until it reaches either the line or regulated pressure of, as in a constructed embodiment of the invention, 30 psi, whichever occurs first. At this point, flow stops and the system is ready to be flushed again.

In accordance with one feature of the present invention, both the water vessel and the upper chamber of the flush valve cylinder are connected at all times, through the water pressure regulator, to the pressurized fresh water supply.

Another feature of the present invention is that a minimum of 75% of the water stored in the water vessel is discharged at a flow velocity in excess of 20 gpm when supply line pressure is equal to or greater than supply line pressure. This feature results in superior bowl extraction and drain line carry of waste.

In accordance with yet another feature of the invention, the flush valve actuator is hydraulically coupled to the upper chamber of the flush valve cylinder. Thus, when the flush valve actuator opens a flow path to ambient pressure, water pressure in the upper chamber of the cylinder is instantaneously but silently relieved creating a pressure differential across the piston allowing pressure on the lower face of the piston to immediately bias the piston and flush valve upwardly to the open condition. The flow of water outwardly of the upper chamber of the flush valve is metered, so as to positively control upward movement of the flush valve piston. Noise is attenuated because the system is hydraulic as opposed to pneumatic.

DETAILED DESCRIPTION OF THE PREFERRED EMBODIMENT OF THE INVENTION

Figure 1:
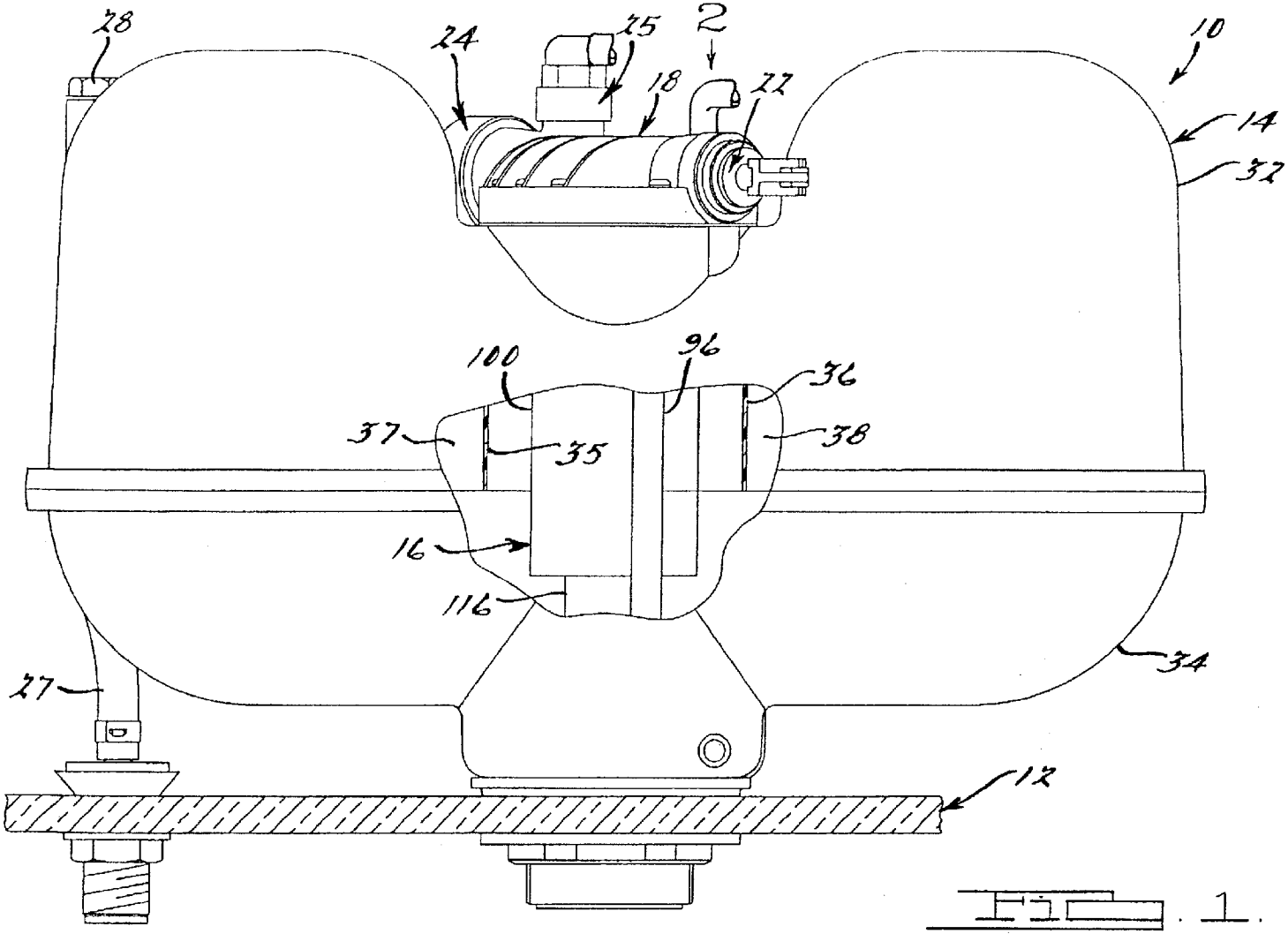
FIG. 1 is an elevational view of an improved pressurized water closet flushing system in accordance with the present invention.
Figure 2:
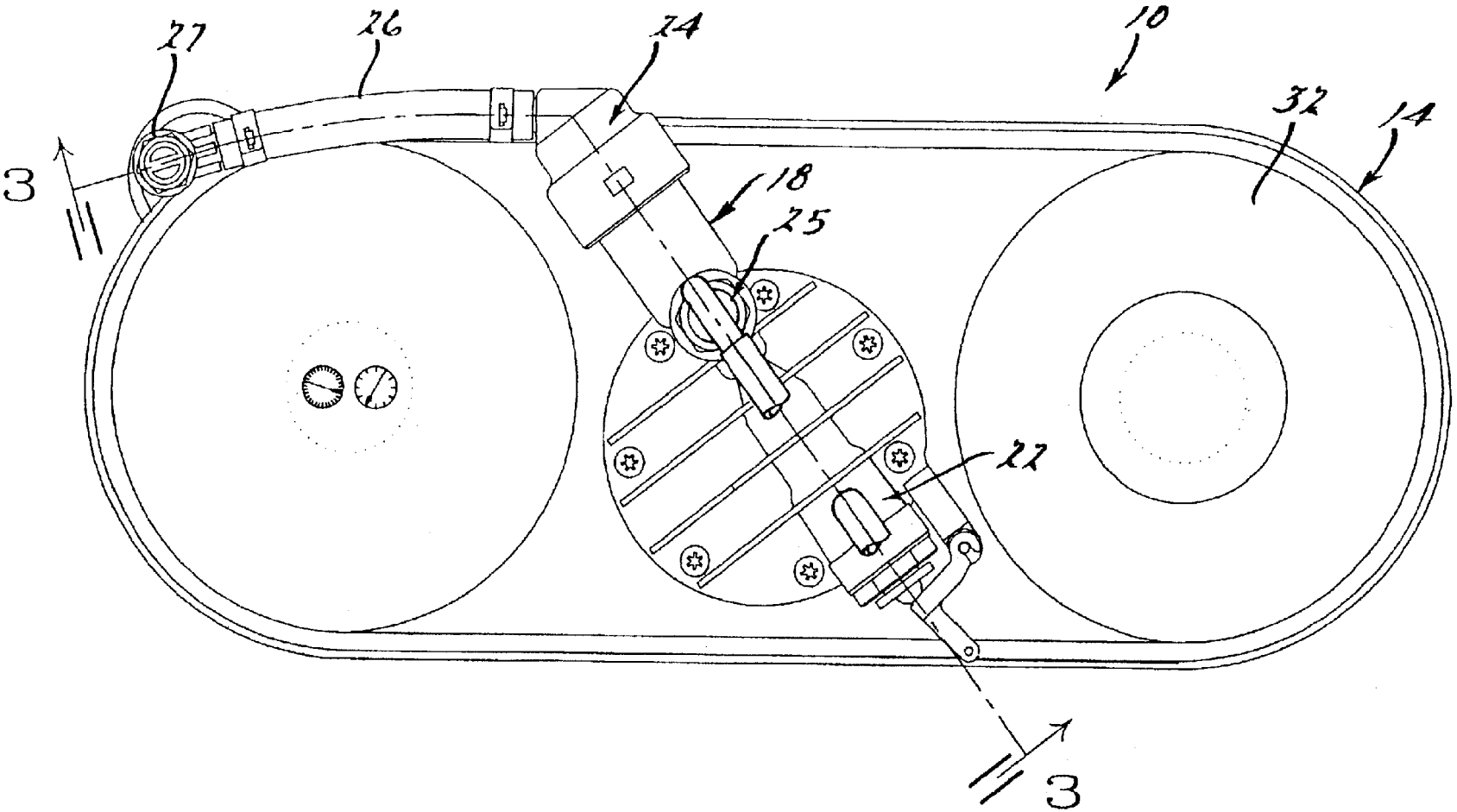
FIG. 2 is a top view taken in the direction of the arrow "2" of FIG. 1.
Figure 3:
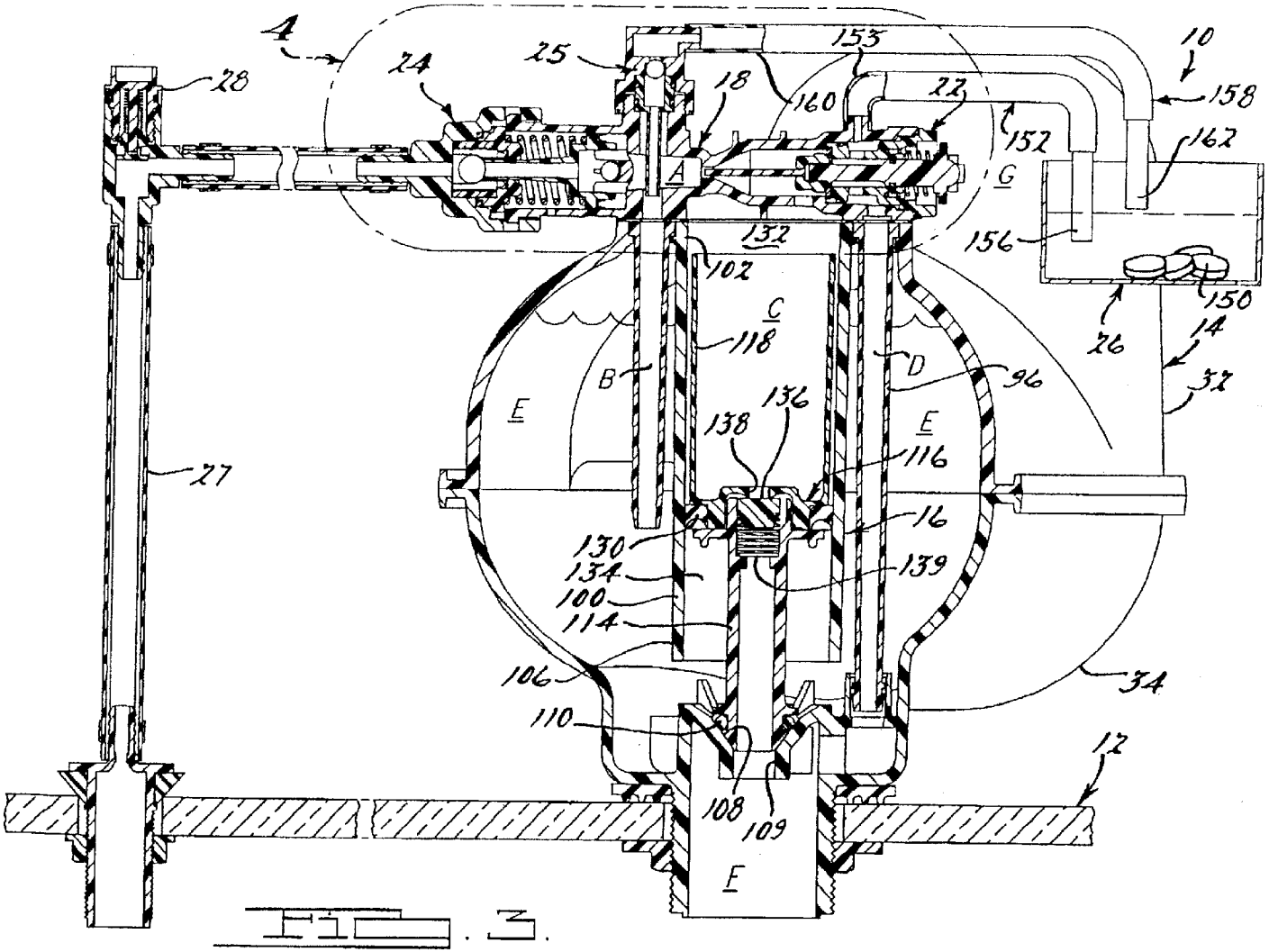
FIG. 3 is a view taken along the line 3—3 of FIG. 2; of a fully charged flushing system.

As seen in FIGS. 1 and 2, a pressurized water closet flushing system 10, in accordance with a preferred and constructed embodiment of the present invention, is shown in operative association with a conventional water closet tank 12. Major components of the system 10 are a water vessel 14, an internal flush valve assembly 16, and a manifold 18 comprising an integral flush valve actuator 22, a water pressure regulator 24, an air induction regulator 25 as seen in FIG. 3, a disinfectant reservoir 26.

Water is supplied to the system 10 from a pressurized source (not shown) and flows upwardly without restriction through an inlet conduit 27 and vacuum breaker 28, thence laterally to the manifold 18. Water is free to flow through the conduit 27 to the manifold 18 at system pressure thence, after regulation, to both the flush valve assembly 16 and water vessel 14, as will be described.

The size of the water vessel 14 is dictated by energy requirements of the system 10. In the preferred constructed embodiment disclosed, the water vessel 14 comprises a pair of vertically stacked half sections 32 and 34. The upper section 32 of the water vessel 14 has a pair of downwardly extending partitions 35 and 36 that create isolated chambers 37 and 38, respectively as long as the water level is above the weld joint between the sections 32 and 34 of the water vessel 14, a typical condition between flushes, as will be described. Accordingly, because the compressed air in the chambers 37 and 38 which powers the system 10 is isolated, a leak in an upper portion of the flush valve assembly 16 will not result in the system 10 becoming waterlogged.

The manifold 18, comprising the water pressure regulator 24, air induction regulator 25 and flush valve actuator 22, is mounted on the upper section 32 of the water vessel 14.

Figure 4:
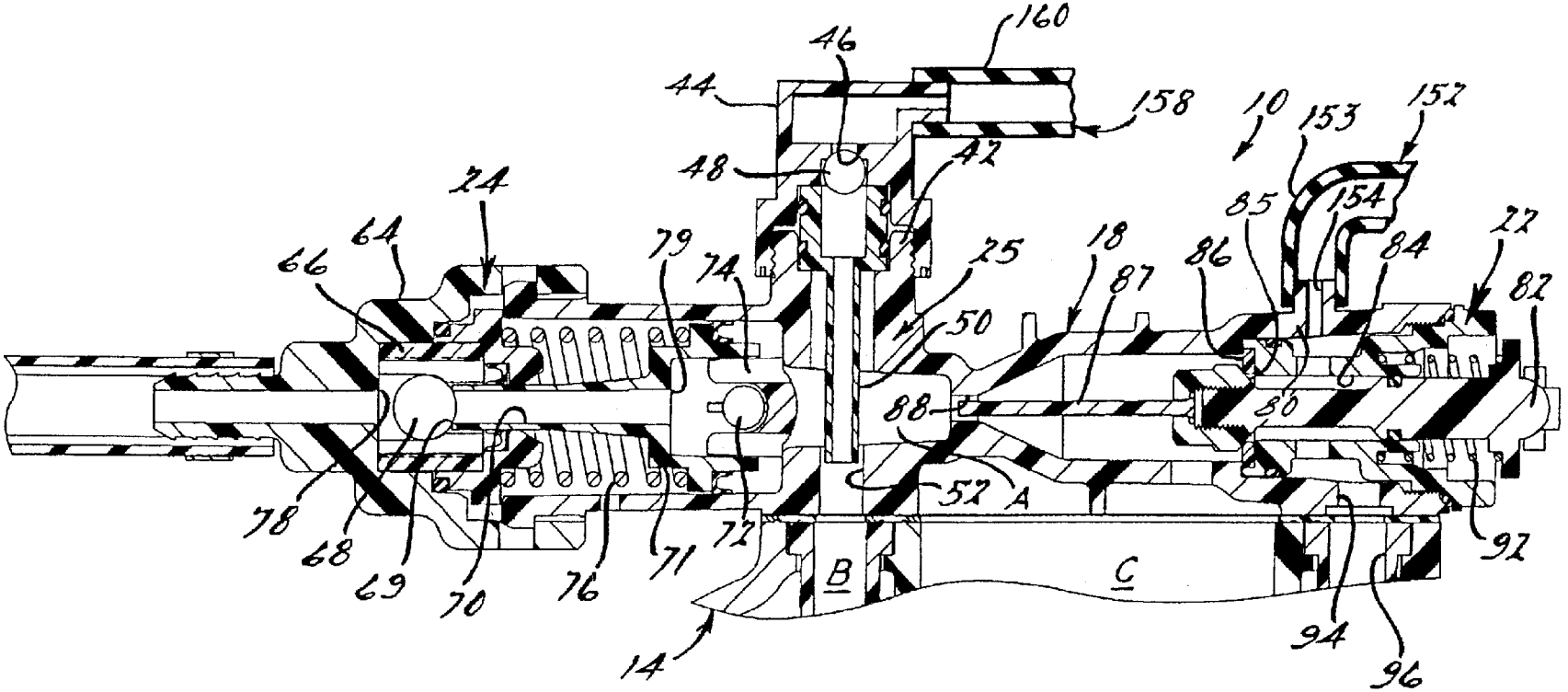
FIG. 4 is a view taken within the circle "4" of FIG. 3.

As best seen in FIG. 4, the integral air induction system 25 on the manifold 18 comprises an externally threaded mounting nipple 42 that accepts a cap 44. The cap 44 has an aperture 46 therein the periphery of which functions as a seat for a ball valve 48. The valve 48 is normally biased to the closed position by water pressure within the manifold 18. However, when internal pressure in the water vessel 14 is reduced during the discharge phase of the flush cycle, to a predetermined minimum, for example 2 PSI, the resultant flow of water into the water vessel 14 creates an air pressure differential across the valve 48 that effects opening thereof and the induction of makeup air into the water stream, replenishing air in the water vessel 14 in a self regulating manner. A tubular sleeve 50 extends downwardly into an orifice 52 in the manifold 18 leading to the water 14 thereby to conduct air into the water stream flowing into the water vessel 14. The air induction system also functions as a vacuum breaker to preclude backflow of water from the system 10 to the water supply system in the event of pressure loss therein.

The water pressure regulator 24 on the manifold 18 is of tubular configuration and has an end cap 64 thereon. A ball valve retainer 66 of cruciform cross section is disposed internally of the end cap 64 for support of a ball valve 68. The valve 68 is biased against an annular seat 69 on a tubular portion 70 of a pressure regulating piston 71 by system water pressure when pressure internally of the water vessel 14 is lower. Similarly, a second ball valve 72 is supported in a second retainer 74, of cruciform cross section. When pressure internally of the water vessel 14 drops below the predetermined pressure, the piston 71 moves away from the end cap 64 under the bias of a regulator spring 76, thereby allowing water to flow past the ball valve 68, thence past the ball valve 72 for distribution to the flush valve 16 and water vessel 14, as will be described.

In the event of pressure loss in the water supply, the ball valves 68 and 72 move to the left, as seen in the drawing, against annular seats 78 and 79, on the end cap 64 and piston 72, respectively to preclude backflow of water from the water vessel 14 to the system.

The manifold 18 also includes the flush valve actuator 22 which comprises a cylindrical housing 80 with a manually operable spool 82 disposed internally thereof that is slidably journaled in a sleeve 84. The spool 82 carries a valve 85 that is normally seated on a valve seat 86. A needle valve 87 is supported on one end of the spool 82 so as to extend into an orifice 88 in the housing 80 to define the area of an annular water inlet orifice that controls the flow of water to the flush valve 16.

Movement of the spool 82 of the flush valve actuator 22 against the bias of a spring 92 moves the valve 85 off its seat 86 to open communication between an upper chamber "C" of the flush valve 16, through an orifice 94 to a pressure relief tube 96 to initiate flush, as will be described. The tube 96 communicates with ambient pressure in the toilet bowl (not shown).

As best seen in FIGS. 3 and 5–7, and in accordance with a feature of the present invention, the flush valve assembly 16 comprises a vertically oriented flush valve cylinder 100 having an upper end portion 102 that abuts the manifold 18. A lower end portion 106 of the cylinder 100 terminates short of a conical valve seating surface 108 of a water discharge passage 109 in the lower shell 34 of the water vessel 14. Flow of water from the water vessel 14 through the passage 109 is controlled by an O-ring valve 110 that is carried by a stem 114 of a flush valve piston 116.

An upper end portion 118 of the piston 116 is of cup shaped configuration and extends upwardly to a predetermined proximity, for example, 0.4 inches, from the upper end 102 of the flush valve cylinder 100 whereby upward movement of the piston 116 is limited to 0.4 inches.

The flush valve piston 116 has an elastomeric piston ring 130 thereon that effects a seal against the cylinder 100 thereby to divide the cylinder 100 into an upper chamber 132 and a main chamber 134 of the water vessel 14. The piston 116 has a valve 136 disposed centrally thereof that normally seals an aperture 138 therein. Upon the occurrence of an over pressure condition in the upper chamber 132, the valve 136 opens against a spring 139 so as to vent the upper chamber 132. This slight venting of the upper chamber 132, at, for example, 45 PSI causes a pressure differential between the upper chamber 132 and the main chamber 134 of the water vessel 14. As a result, the flush valve piston 116 starts to lift which allows the pressure in the main chamber 134 of the water vessel 14 to be reduced. Initially, an oscillation occurs as a pressure differential is repeatedly created which is eventually equalized in both chambers, thus preventing the pressure in the main chamber 134 of the water vessel 14 from exceeding a predetermined level, for example 80 PSI.

In accordance with another feature of the invention, disinfectant is automatically injected into the toilet bowl (not shown) upon actuation of the pressurized flushing system 10. However, disinfectant does not reside in the water vessel 14 between flushes thereby to preclude attack of the vessel and seals, therein by the chemical disinfectant. The disinfectant container 26 containing, for example, water soluble disinfectant pellets 150 is connected to the manual actuator 22 on the manifold 18 by a water inlet conduit 152. One end 153 of the water inlet conduit 152 is connected to a nipple 154 on the actuator 22 which communicates with the valve 85 carried by the actuator spool 82. Sizing of the orifice in the nipple 154 combined with the time during which the nipple is exposed to pressured water, controls the amount of water flowing through the tube 152 to the disinfectant reservoir 26, as will be described. An opposite end 156 of the water inlet conduit 152 communicates with the reservoir 26. A disinfectant outlet conduit 158 has one end 160 connected to the cap 44 of the air inducer 25 above the ball valve 48 therein. An opposite end 162 of the conduit 158 extends downwardly into the reservoir 150 a predetermined distance, as will be described.

Figure 5:
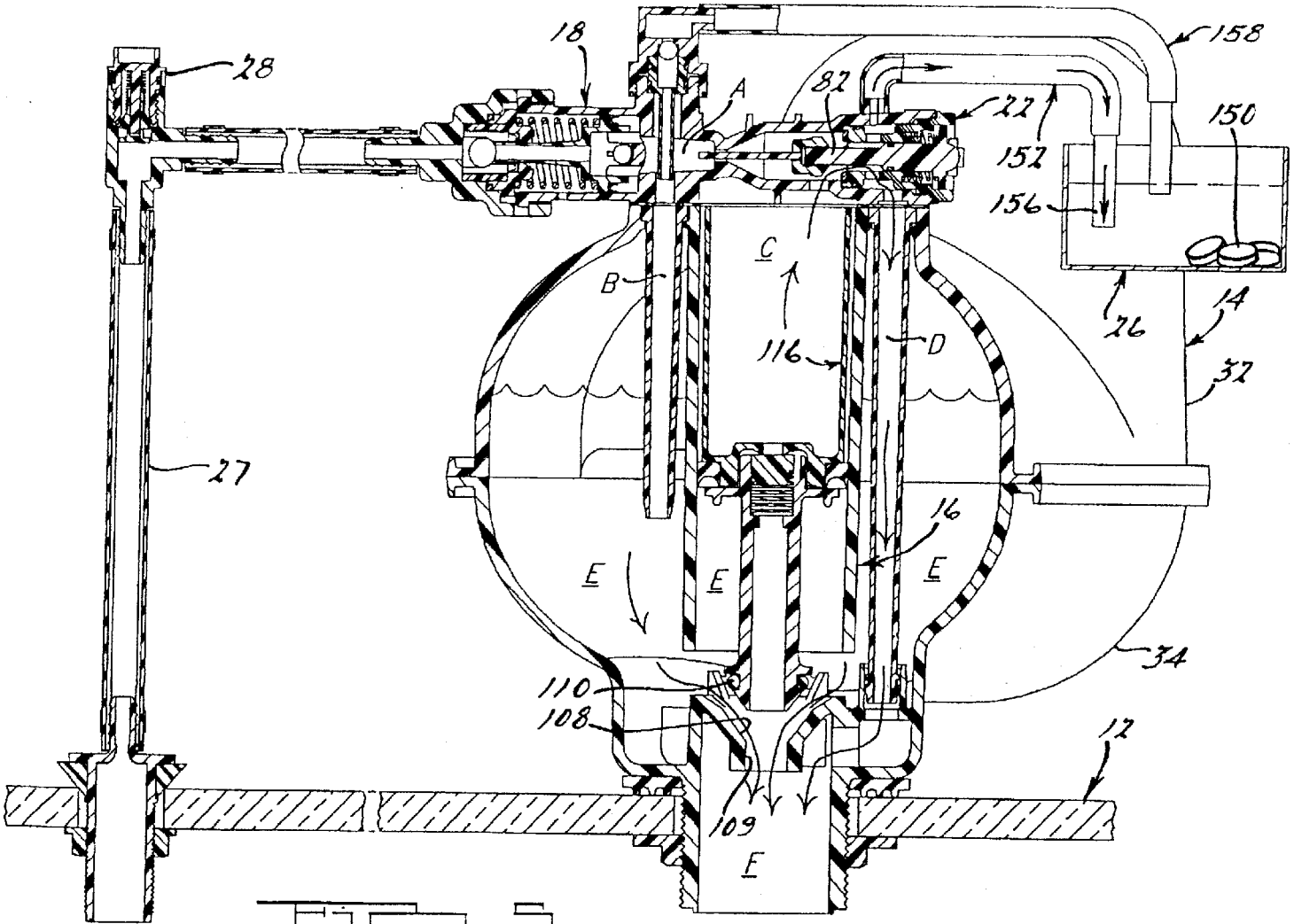
FIG. 5 is a view similar to FIG. 3 upon the initiation of flush action.

Prior to flush of the system 10, as best seen in FIG. 3, disinfectant resides in the reservoir 26 just below the lower end 162 of the disinfectant outlet conduit 158. As best seen in FIG. 5, upon flush of the system 10, due to movement of the spool 82 on the manual actuator 22 to the left, a water flow path is opened from the chamber C in the flush valve 16, past the valve 85 to the nipple 154, thence through the water inlet conduit 152 to the disinfectant reservoir 150. Based on the sizing of the nipple 154 and the duration of the flush discharge, a controlled amount of water is directed through conduit 152 into reservoir 26 by back pressure created by discharge from the main chamber 134 into the water closet bowl. The duration of discharge from the main chamber 134 controls the amount of water diverted through nipple 154. The volume of water flowing to the reservoir 150 is calculated to elevate the level of disinfectant therein a predetermined amount above the lower end 162 of the disinfectant outlet conduit 158. Normally, flow out of the reservoir 26 is precluded by the ball valve 48 of the air inducer 25 which is biased to the closed condition by pressure internally of the manifold 18 and water vessel 14.

Figure 6:
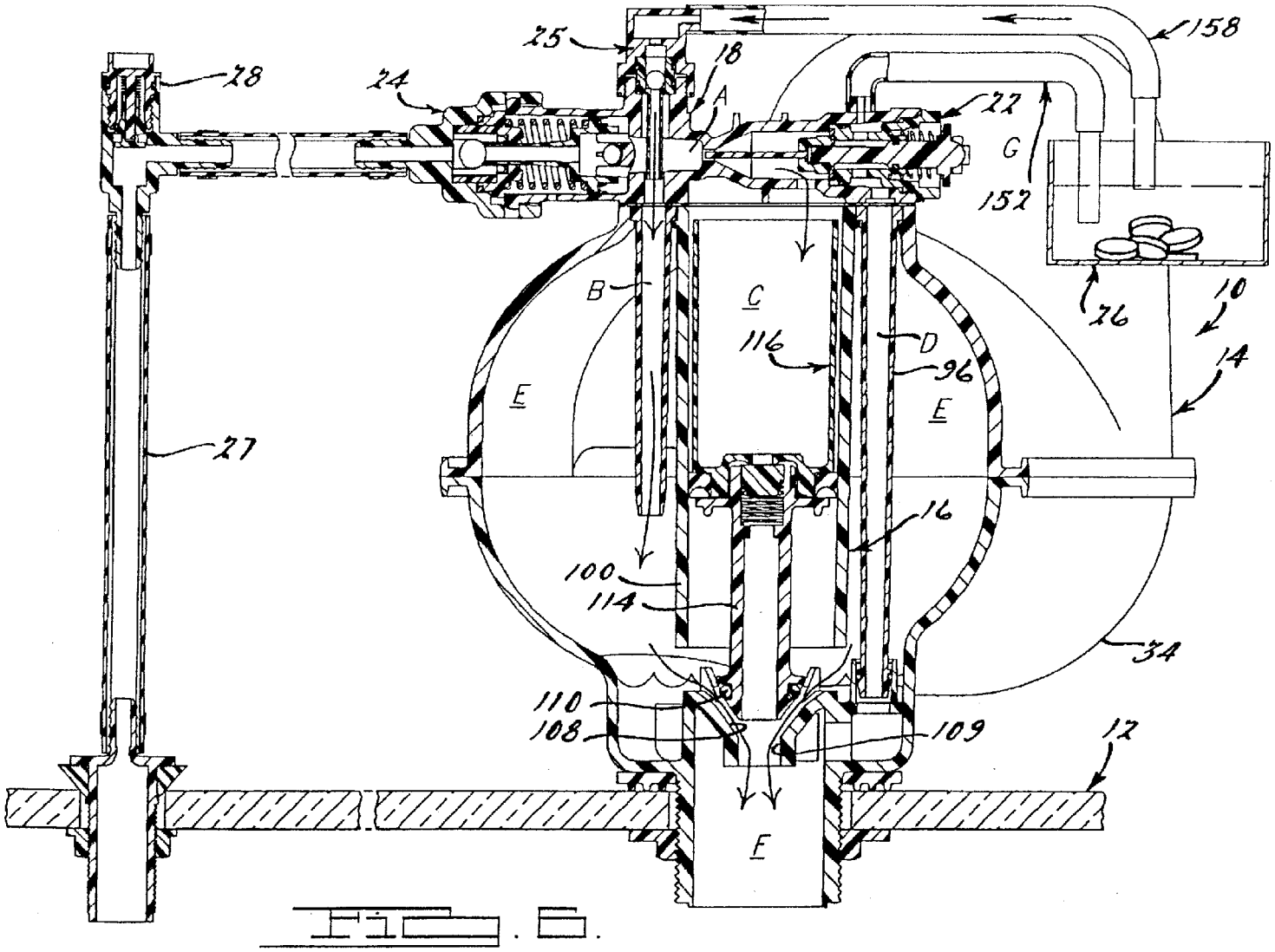
FIG. 6 is a view similar to FIG. 3 wherein pressurized flush is completed but bowl refill is continuing.

As flush progresses to the point seen in FIG. 6, wherein water in the water vessel 14 has been substantially evacuated, pressure is reduced in the water vessel 14 sufficiently to allow a pressure differential across the ball valve 48 created by the venturi effect due to the flow of water past the tube 50 that extends into the water inlet orifice 52 in the water vessel 14, to open the valve 48. Opening of the valve 48 induces a flow of disinfectant from the reservoir 26 through the air inducer 25 to the water vessel 14. After the level of disinfectant in the reservoir 26 is lowered below the level of the end portion 162 of the conduit 158, disinfectant flow terminates and air is drawn through the conduit 158 to the air inducer 25, thence to the water vessel 14 to replenish the air supply therein, as required.

Figure 7:
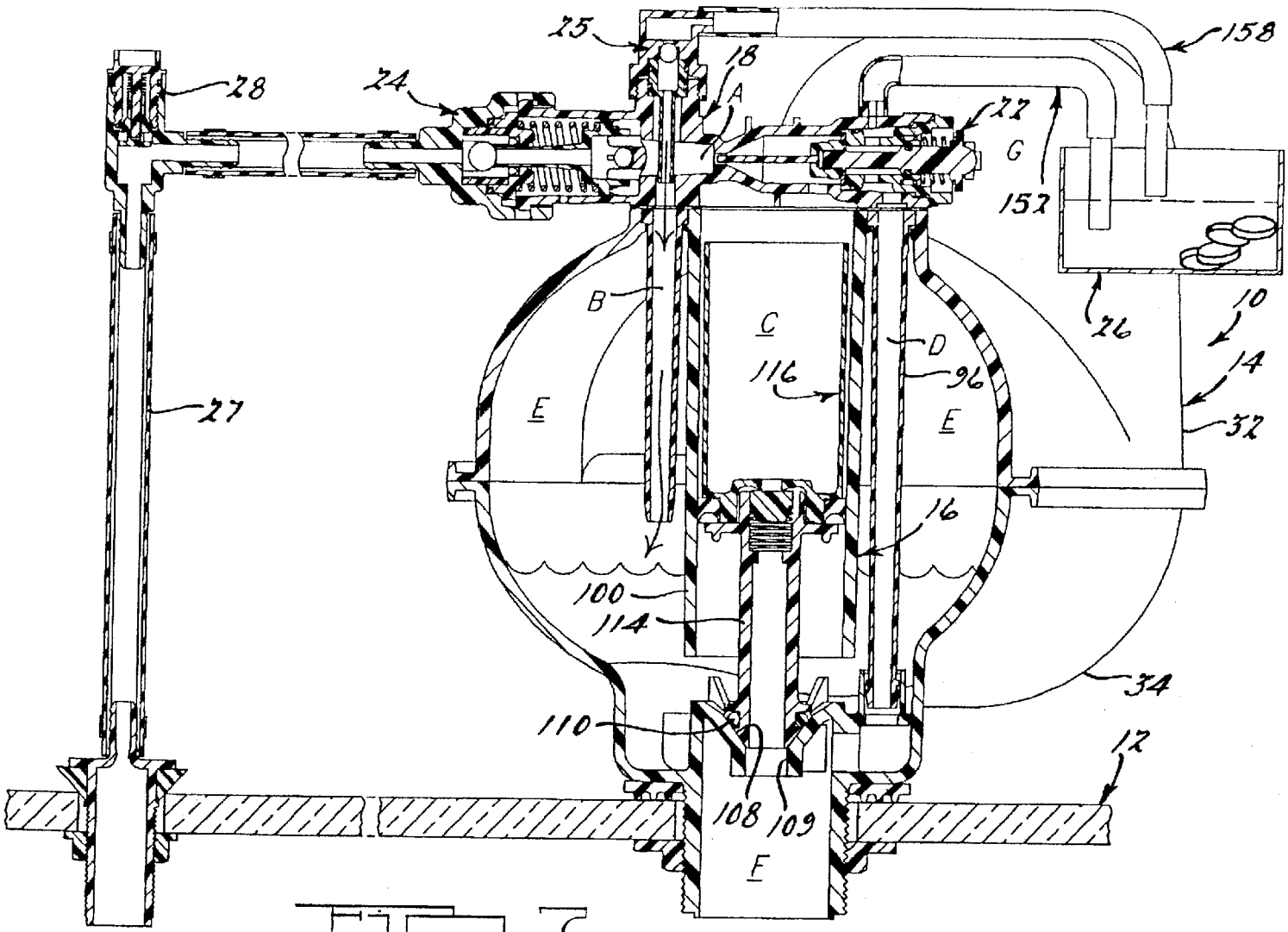
FIG. 7 is a view similar to FIG. 3 with bowl refill completed, the flush valve closed, and refill of the water vessel and pressurization commencing.

As seen in FIG. 7, vessel refill has commenced and the valve 48 of the air inducer 25 is closed due to internal pressure within the manifold 18. From the foregoing it should be apparent that water stored in the water vessel 14 is free of disinfectant because the flush valve 110 does not seal off the water vessel 14 until disinfectant drawn into the water vessel 14 has ample time to exit the water vessel 14 and enter the toilet bowl, thus protecting the seals and other components of the pressurized flush system 10 from deterioration.

In operation, as seen in FIG. 3, the water vessel 14 is fully charged with air and water at, for example, 22 psi and the system 10 is ready for flush. Specifically, zones (A), (B), (C) and (E) are at 22 psi. Zones (D), (F) and (G) are at atmospheric pressure.

FIG. 5 illustrates the condition that obtains when flush action is initiated. Flush occurs when the actuator spool 82 of the flush valve actuator 22 is depressed, allowing pressurized water in zone "C" to discharge through the actuator 22 into zone "D" thence to zone "F" as well as to flow through the water inlet conduit 152 to raise the level of disinfectant in the reservoir 150. The pressure differential established between zone "E" and zone "C" forces the piston 116 of the flush valve assembly 16 to lift, creating an escape path for water in zone "E" through the discharge aperture 109 into the toilet bowl at zone "F". It is to be noted that the piston 116 of flush valve assembly 16 lifts, for example, 0.40 inches, discharging only a corresponding volume of water from zone "C". This volume of water is determined to be the amount of water capable of being discharged through the flush valve actuator 22 in ¼ second. As a result, the same amount of water is required after each flush to refill zone "C" and cause the flush valve 110 to seal regardless of whether the spindle 82 of the flush valve actuator 22 is depressed for more than ¼ second.

As flush progresses, pressure in zone "E" begins to lower, allowing the regulator 24 to begin opening and flow to begin through zone "A" to zones "B" and "C", flow through zones "A" and "B" is at maximum when pressure within vessel "E" is zero.

FIG. 6 illustrates the condition when pressurized flush is substantially completed but water and disinfectant continue to flow through the water vessel 14 into the toilet bowl for refill. In this condition water flows into Zones "A", "B" and "C" but disinfectant flows only into zones "B" and "E" thence to zone "F". After the controlled amount of disinfectant has passed through zone "B", air is induced through the air inducer 25 into zone "B", thence into the water vessel 14. Until the flow of water into zone "C" causes the flush valve piston 116 and the O-ring flush valve 110 to close against its seat 108, water flowing into zone "E" will drain into zone "F" to refill the toilet bowl (not shown).

FIG. 7 illustrates the condition when bowl refill is completed, the flush valve 110 is closed, and fill and pressurization of the water vessel 14 begins. When this condition obtains all flow through zone "A" is diverted through zone "B" into zone "E" of the water vessel 14. It is to be noted that when the piston 116 of the flush valve assembly 16 is in the closed position and zone "C" is full of water, the air inducer 25 closes due to pressure buildup in zones "A", "B", "C" and "E".

Figure 8:
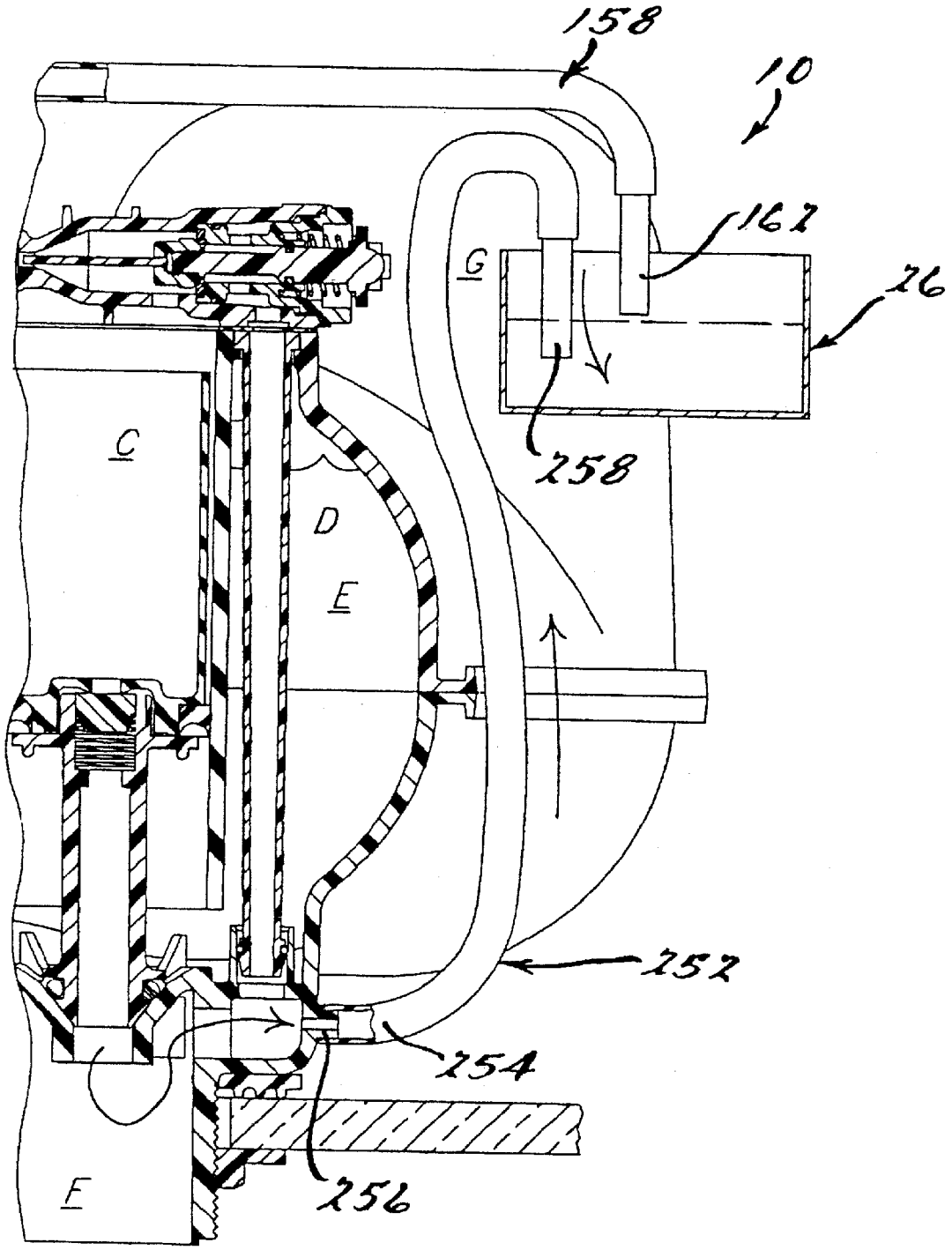
FIG. 8 in a fragmentary view, partially in cross section, of an alternative water supply system to the disinfectant reservoir.

As seen in FIG. 8, a modified water supply system to the disinfectant container 26 comprises a water inlet conduit 252 having one end 254 connected to a nipple 256 which communicates with the water discharge zone "E". Sizing of the orifice in the nipple 256, in conjunction with the duration of flush, controls the amount of water flowing through the tube 252 to the disinfectant reservoir 26. An opposite end 258 of the water inlet conduit 152 extends into the reservoir 26. Discharge of disinfectant from the reservoir 26 through the conduit 158 is as discussed herein.

It is to be noted that the pressurized water closet of the present invention is fully operational without the use of the herein described disinfectant reservoir 26. From the aforesaid description it should be apparent that the water closet flushing system 10 of the present invention has many unique features. Specifically, the system 10 exhibits quiet discharge upon actuation since the flush valve piston 116 opens instantaneously but moves upwardly relatively slowly so as to gradually fill the water discharge outlet 109. This relatively slow opening movement is controlled by either the sizing of the flow path from zone "C" or the flow path to zone "D". It is to be noted that the size of the needle valve orifice 88 in conjunction with the needle valve 87 controls the flow rate of new water into the upper chamber "C" of the flush valve 16. In a constructed embodiment of the invention the annulus is 0.00078 $in^2$. Clogging of the annulus by particles in the water supply system is minimized because, when depressed, the needle valve 87 clears any foreign matter that lodges in the orifice 88.

Refill volume of the toilet bowl can be varied by varying the diameter of either the orifice 52 or the orifice 88 in conjunction with the diameter of the tube 50 or needle valve 87, respectively, which varies the ratio of water passed into zones "B" and "C" respectively, thus speeding or slowing movement of the piston 116 and closure of the flush valve assembly 16 after flushing and/or the amount of bowl refill water passed through the water vessel 14 to the toilet bowl (not shown). As a result, the system 10 can be precisely tuned to different bowl configurations to obtain maximum water conservation and performance. Bowl refill volume can also be varied by changing the amount of water discharged from the upper chamber "C" of the flush valve 16. For example, if 0.4" lift is changed to 0.8" lift, the hold-open interval of the flush valve will be more than doubled because more water must flow into the upper chamber "C" to force the flush valve piston 116 back to its seat. This also increases total flush volume.

Internal back-check is achieved by the free floating ball valves 68 and 72 in the pressure regulator 24. Under negative pressure conditions, eg. water vessel 14 pressure higher than water supply, the ball valves 68 and 72 move against the seats 78 and 79 respectively, closing off reverse flow.

Yet another unique feature of the pressurized water closet flushing system 10 of the present invention is that the system consumes less water at higher supply line pressure (i.e. 50 to 80 psi) than at lower pressures (i.e. 20 psi). Stated in another manner, relatively high supply pressure causes the flush valve piston 116 to close relatively quickly after the vessel is flushed. Moreover, the system 10 exhibits a minimum differential in water consumption at varying pressures, for example, 20 to 80 psi.

While the preferred embodiment of the invention has been disclosed, it should be appreciated that the invention is susceptible of modification without departing from the spirit of the invention or the scope of the subjoined claims.

I claim:

1. An improved pressurized water closet comprising:

a water vessel;

an annular valve seat in a lower portion of said water vessel defining a water outlet therein;

a flush valve cylinder vertically oriented above the water outlet in said water vessel;

a piston in said flush valve cylinder defining an upper chamber therein, said piston being movable axially of said cylinder solely by a water pressure differential on opposite sides of said piston;

a flush valve on said piston normally seated on the valve seat of said water vessel for closing the water outlet therein;

a manifold mounted directly on said water vessel; and means in said manifold for concomitantly venting the upper chamber of said cylinder and connecting a pressurized water source to said water vessel and to the upper chamber of said flush valve cylinder.

2. The water closet of claim 1 wherein said means comprises a flush valve actuator operable to connect the upper chamber of said flush valve cylinder with the ambient environment so as to relieve water pressure therein to condition said piston and the valve thereon for movement to the open condition to discharge water from said water vessel through the water outlet therein.

3. The water closet of claim 2 wherein said flush valve actuator is disposed internally of said manifold.

4. The pressurized water closet of claim 1 wherein said manifold includes a pressure regulator having means for admitting ambient air into water flowing through said pressure regulator to said water vessel.

5. The pressurized water closet of claim 4 wherein said pressure regulator comprises a pair of floating back check valves to preclude flow of water from said water vessel in reverse through said pressure regulator.

6. The pressurized water closet of claim 2 wherein said flush valve actuator comprises an annulus surrounding a needle valve for the control of water flowing to the upper chamber of said cylinder.

7. A pressurized water closet flushing system in accordance with claim 2 including a disinfectant reservoir;

a water supply conduit extending from said water vessel, to said reservoir;

a disinfectant conduit extending from said reservoir to said water vessel; and means for controlling the amount of disinfectant injected into said water vessel upon each flush.

8. The pressurized water closet of claim 1 wherein said water vessel comprises a pair of spaced domes for isolating pressurized air from said flush valve cylinder.

9. The pressurized water closet of claim 1 comprising a water discharge tube extending internally of said water vessel and communicating with said flush valve actuator and with the ambient atmosphere on the opposite side of the water outlet of said water vessel from the valve on said piston.

10. The pressurized water closet of claim 6 wherein said needle valve is reciprocable in said annulus to effect cleaning thereof.

11. An improved pressurized water closet comprising a water vessel;

an annular valve seat in a lower portion of said water vessel defining a water outlet therein;

a flush valve cylinder vertically aligned with said valve seat; [and]

a pair of spaced segregated air chambers disposed on opposite sides of said flush valve cylinder above the water outlet in said water vessel for precluding water logging thereof*;*

*a manifold mounted directly on said water vessel; and*

*means in said manifold for concomitantly venting said pair of spaced segregated air chambers and connecting a pressurized water source to said water vessel and said flush valve cylinder*.

12. An improved pressurized water closet flushing system comprising;

a water vessel;

an annular valve seat in a lower portion of said water vessel defining a water outlet therein;

a flush valve cylinder vertically oriented above the water outlet in said water vessel;

a piston in said flush valve cylinder defining an upper chamber therein and movable axially thereof solely by a water pressure differential thereacross;

a flush valve on said piston normally seated on the valve seat of said water vessel for closing the water outlet therein; and a pressure relief valve on said piston openable on the occurrence of excessive pressure in the upper chamber of said cylinder to vent pressure therein to atmosphere.

13. The pressurized water closet of claim 7 wherein said water supply conduit is connected to the flush valve actuator on said water vessel.

14. The pressurized water closet of claim 7 wherein said water supply conduit is connected to said water vessel downstream of the valve seat thereon.

15. The pressurized water closet of claim 11 wherein said air chambers comprise partitions extending downwardly from an upper wall of said water closet to a central portion thereof.

* * * * *